(12) United States Patent
Markusic

(10) Patent No.: US 11,414,036 B2
(45) Date of Patent: Aug. 16, 2022

(54) TORSO STABILIZATION RESTRAINT

(71) Applicant: Honda Motor Co., Ltd., Tokyo (JP)

(72) Inventor: Craig A. Markusic, Bellefontaine, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 64 days.

(21) Appl. No.: 16/809,877

(22) Filed: Mar. 5, 2020

(65) Prior Publication Data

US 2021/0276506 A1 Sep. 9, 2021

(51) Int. Cl.
| | |
|---|---|
| *B60R 21/18* | (2006.01) |
| *B60R 21/233* | (2006.01) |
| *B60R 21/207* | (2006.01) |
| *B60R 21/231* | (2011.01) |

(52) U.S. Cl.
CPC ............ *B60R 21/18* (2013.01); *B60R 21/207* (2013.01); *B60R 21/233* (2013.01); *B60R 21/23138* (2013.01); *B60R 2021/23316* (2013.01)

(58) Field of Classification Search
CPC ..... B60R 21/18; B60R 21/207; B60R 21/233; B60R 21/23138; B60R 2021/23316
See application file for complete search history.

(56) References Cited

U.S. PATENT DOCUMENTS

| | | | | |
|---|---|---|---|---|
| 3,430,979 A | * | 3/1969 | Terry | ...................... B60R 21/18 |
| | | | | 280/733 |
| 3,623,768 A | * | 11/1971 | Capener | .................. B60N 2/757 |
| | | | | 297/330 |
| 3,981,518 A | * | 9/1976 | Pulling | ................. B60N 2/4221 |
| | | | | 280/730.1 |
| 5,184,844 A | * | 2/1993 | Goor | ....................... B60R 21/18 |
| | | | | 280/808 |
| 5,390,952 A | * | 2/1995 | Goor | ....................... B60R 21/01 |
| | | | | 280/730.1 |
| 6,336,656 B1 | * | 1/2002 | Romeo | .................... B60R 21/18 |
| | | | | 280/733 |
| 7,163,236 B2 | * | 1/2007 | Masuda | ................... B60R 21/18 |
| | | | | 280/733 |

(Continued)

FOREIGN PATENT DOCUMENTS

| | | | | |
|---|---|---|---|---|
| CA | 2289525 A1 | * 11/1998 | ............. | B60R 21/18 |
| CN | 108692953 A | * 10/2018 | ....... | B60R 21/23138 |

(Continued)

*Primary Examiner* — Karen Beck
(74) *Attorney, Agent, or Firm* — Rankin, Hill & Clark LLP

(57) ABSTRACT

A torso stabilization restraint configured to restrain a user in a seat, includes an inflatable first module, an inflatable second module, an inflatable third module, and connectors arranged on one or more of the modules. The connectors are configured to reversibly connect a) the first module and the second module, and b) the second module and the third module when the first, second, and third modules are inflated. When the first, second, and third modules are inflated and connected, the torso stabilization restraint and the seat combine to exert radially inward directed pressure on a torso of the user. The first and second modules are deployable from a seat. The second module is deployable from a seat belt, is arranged between the first and second modules, and is configured to couple to the first and second modules when the modules are inflated.

19 Claims, 5 Drawing Sheets

(56) References Cited

U.S. PATENT DOCUMENTS

| | | | |
|---|---|---|---|
| 7,571,931 B2 * | 8/2009 | Watanabe | B60R 21/18 280/733 |
| 7,669,891 B2 | 3/2010 | Azuma et al. | |
| 8,038,170 B2 | 10/2011 | Haraoka et al. | |
| 8,104,790 B2 | 1/2012 | Nezaki | |
| 9,085,279 B2 | 7/2015 | Fukawatase et al. | |
| 9,517,744 B2 | 12/2016 | Shimazu | |
| 10,399,529 B2 * | 9/2019 | Spahn | B60R 21/231 |
| 10,407,015 B2 * | 9/2019 | Belwafa | B60R 21/23138 |
| 10,471,923 B2 * | 11/2019 | Jimenez | B60R 21/2338 |
| 10,513,206 B2 * | 12/2019 | Spahn | B60N 2/4207 |
| 10,875,486 B2 * | 12/2020 | Kim | B60R 21/207 |
| 2005/0236209 A1 * | 10/2005 | Chernoff | B60R 21/01552 280/801.1 |
| 2006/0049617 A1 * | 3/2006 | Mowry | B60R 21/207 280/730.2 |
| 2006/0119085 A1 * | 6/2006 | Masuda | B60R 21/18 280/733 |
| 2006/0192367 A1 * | 8/2006 | Zumpano | B60R 21/18 280/730.1 |
| 2006/0202452 A1 * | 9/2006 | Breed | B60R 21/30 280/730.2 |
| 2007/0096535 A1 * | 5/2007 | Lundell | B60R 21/01512 297/470 |
| 2010/0025972 A1 * | 2/2010 | Nezaki | B60R 22/26 280/730.1 |
| 2012/0133114 A1 * | 5/2012 | Choi | B60R 21/214 280/728.2 |
| 2015/0054264 A1 * | 2/2015 | Hirako | B60R 21/231 280/728.3 |
| 2015/0259071 A1 * | 9/2015 | Santana-Gallego | B64D 11/062 244/121 |
| 2016/0039385 A1 * | 2/2016 | Watamori | B60R 21/23138 280/730.1 |
| 2017/0225788 A1 * | 8/2017 | Humbert | B64D 11/06205 |
| 2017/0282832 A1 | 10/2017 | Kondo et al. | |
| 2018/0043852 A1 * | 2/2018 | Fischer | B60R 21/233 |
| 2018/0281727 A1 | 10/2018 | Jenny | |
| 2019/0023214 A1 * | 1/2019 | Kitagawa | B60R 21/01552 |
| 2019/0047504 A1 * | 2/2019 | Sugishima | B60R 21/207 |
| 2019/0077359 A1 | 3/2019 | Kim | |
| 2019/0283700 A1 * | 9/2019 | Kwon | B60R 21/207 |
| 2020/0324728 A1 * | 10/2020 | Deng | B60R 22/12 |
| 2021/0094504 A1 * | 4/2021 | Tanaka | B60R 21/23138 |
| 2021/0138989 A1 * | 5/2021 | Markusic | B60R 21/18 |
| 2021/0146874 A1 * | 5/2021 | Lee | B60R 21/233 |

FOREIGN PATENT DOCUMENTS

| | | | | |
|---|---|---|---|---|
| DE | 102017209417 | | 12/2018 | |
| DE | 102017218331 | | 4/2019 | |
| DE | 102019203316 A1 | * | 9/2019 | B60R 21/23138 |
| DE | 102019116586 A1 | * | 12/2020 | B60R 21/268 |
| JP | 2009137441 A | * | 6/2009 | |
| JP | 2011051448 | | 3/2011 | |
| JP | 2018086990 A | * | 6/2018 | B60R 21/268 |
| KR | 20200130765 A | * | 11/2020 | |
| WO | WO2008139655 | | 11/2008 | |
| WO | WO-2012003949 A1 | * | 1/2012 | B60R 22/023 |
| WO | WO-2019197164 A1 | * | 10/2019 | B60R 21/16 |

* cited by examiner

TORSO STABILIZATION RESTRAINT

BACKGROUND

In head-on vehicle collisions, where the vehicle hits an object at the front of the vehicle, the front of the torso (i.e. thorax and abdomen) of an occupant is subject to simple (i.e. head-on) stresses from the collision. These stresses originate from the forward momentum of the body of the occupant coming into contact with the vehicle interior (steering wheel, seat, door panel) and the vehicle restraint system (seat belt and airbag(s)). However, in side or oblique vehicle collisions, where the vehicle collides with an object at an angle other than at the front of the vehicle, the occupant's torso may be loaded in a complex way (i.e. not straight on from the front) as a result of interaction with these vehicle components. This complex loading condition may cause high localized deflections in areas of the torso that may or may not be directly interacting with the restraint or interior.

Current restraining systems typically include side- and front-impact air bags and seat belts and simply counteract the momentum of the occupant's body and buffer the occupant from impact forces during the collision.

BRIEF DESCRIPTION

According to one aspect, a torso stabilization restraint includes an inflatable first module, an inflatable second module, an inflatable third module, and connectors arranged on one or more of the modules and configured to reversibly connect a) the first module and the second module, and b) the second module and the third module when the first, second, and third modules are inflated. The torso stabilization restraint is configured to restrain a user in a seat. When the first, second, and third modules are inflated and connected, the torso stabilization restraint and the seat combine to exert radially inward directed pressure on a torso of the user.

According to another aspect, a torso stabilizer includes an inflatable left module deployable from a seat, an inflatable right module deployable from the seat, an inflatable central module deployable from a seat belt associated with the seat. The central modules is configured to couple to the left and right modules when the modules are inflated.

DETAILED DESCRIPTION

Figure 1:
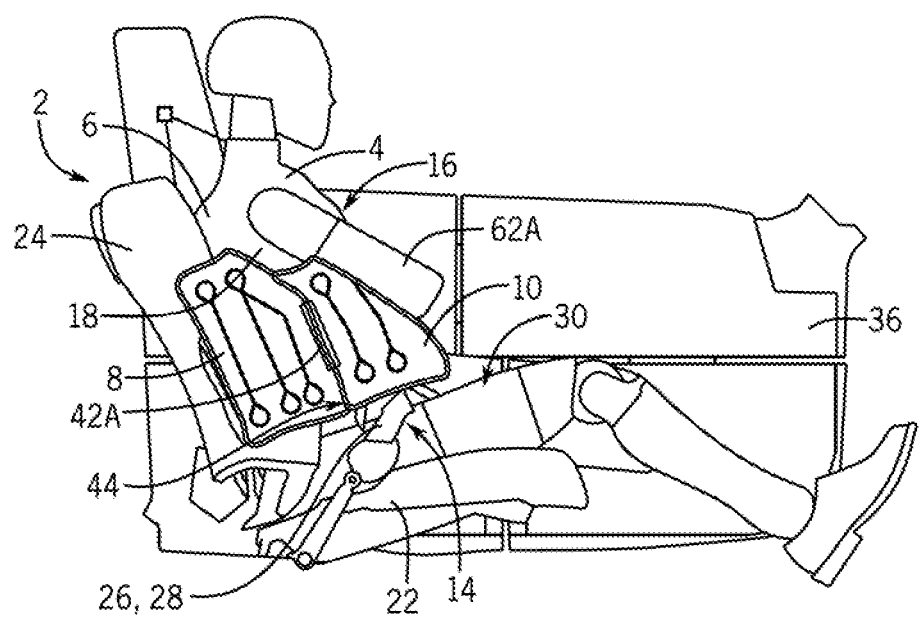
FIG. 1 is an inboard side view of a torso stabilization restraint according to the present subject matter.
Figure 2:
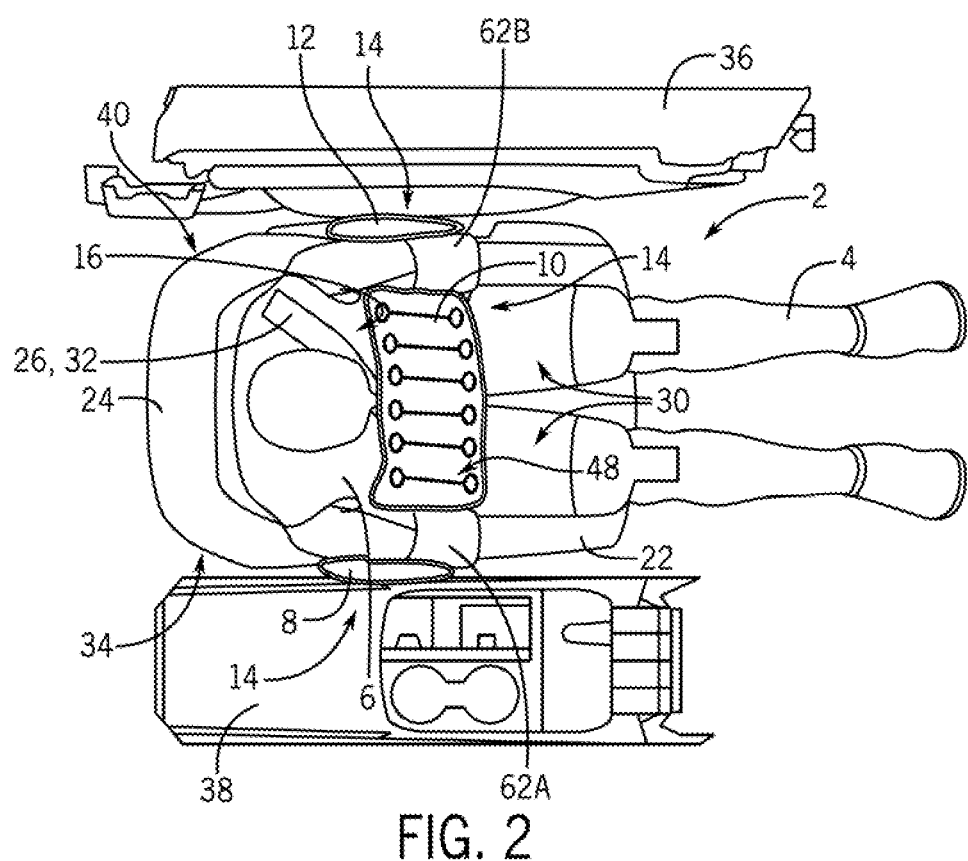
FIG. 2 is a plan view of the torso stabilization restraint of FIG. 1.
Figure 3:
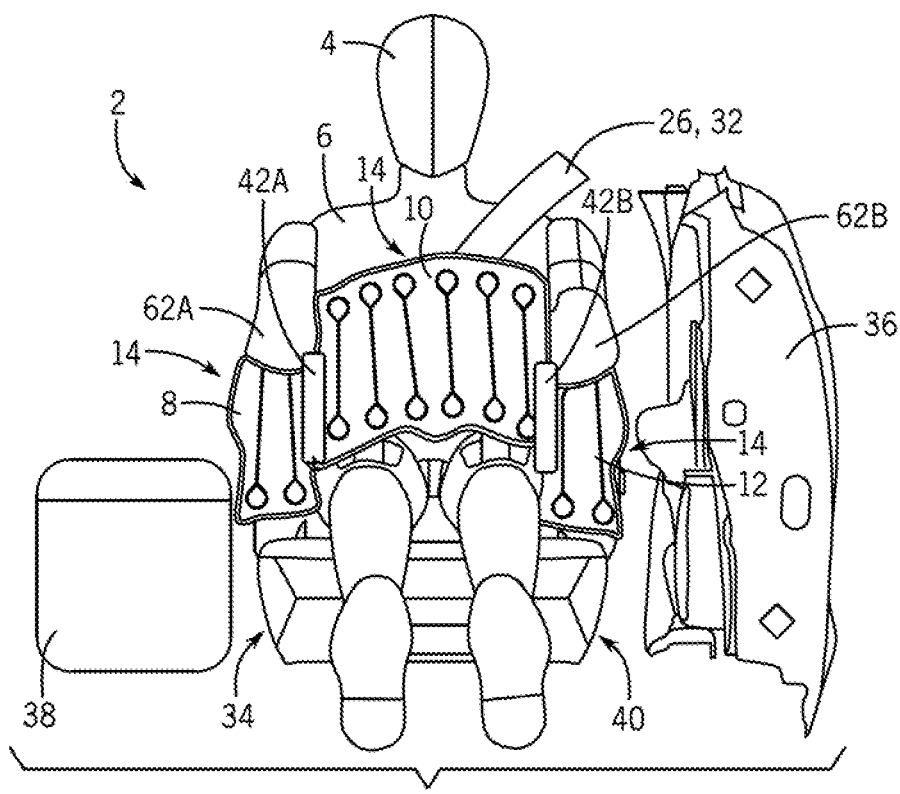
FIG. 3 is a front view of the torso stabilization restraint of FIG. 1.
Figure 4:
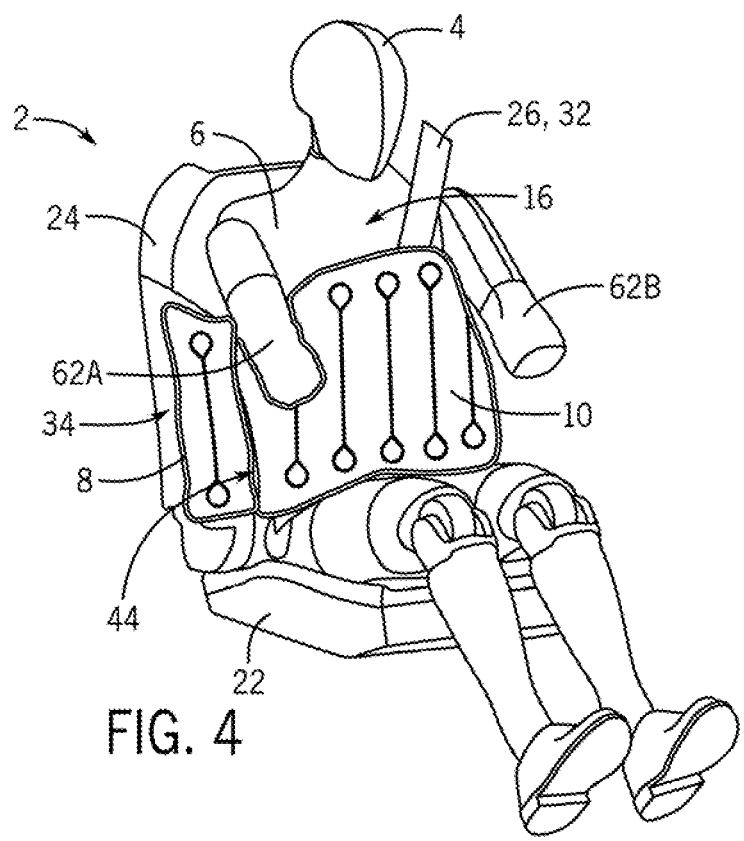
FIG. 4 is a front inboard perspective view of the torso stabilization restraint of FIG. 1.

Although current retraining systems may be satisfactory in restraining the occupant's body during collisions and offering a buffer from impact forces, there may be opportunity to more adequately stabilize the torso against high localized deflections, especially during oblique collisions.

The present invention provides a torso stabilization restraint 2 that offers torso stabilization and protection against high localized deflections from impact forces during vehicle collisions, including during oblique vehicle collisions. The torso stabilization restraint 2 engages an occupant 4 (also referred to herein as "user") during a collisions, and specifically surrounds the torso 6 of the occupant 4, to inhibit localized torso deformations, including thorax deformations.

The torso stabilization restraint 2 includes three separate and distinct inflatable modules 8, 10, 12. During a collision, the three modules 8, 10, 12 deploy from storage, inflate, and connect to one another to form a unified support 14 in contact with the front 16 and sides 18, 20 of the torso 6 of the occupant 4. A vehicle seat 22, and specifically the seat back 24, may contact a back 21 of the torso 6, and optionally the sides 18, 20 or the torso 6. The unified support 14 in combination with the seat back 24 may therefor form a perimeter around the torso 6 of the occupant 4 sitting in the seat 22 (see FIG. 5). The torso stabilization restraint 2 may function in conjunctions with a seat belt 26 associated with the seat 22 and/or a seat frame within the seat 22. The seat belt 26 may include a lap belt 28 configured to be arranged over the lap 30 of the occupant 4, and a shoulder belt 32 configured to be arranged diagonally in front 16 of the torso 6 of the occupant 4. The seat belt 26 may secure the occupant 4 in the seat 22 during a collision, while the unified support 14 supports the torso 6 against high localized deflections.

After connection of the three modules 8, 10, 12 to form the unified support 14, further inflation of the modules 8, 10, 12 may cause the unified support 14 to contract around the torso 6, and may provide a certain stiffness level once fully inflated. In combination with the vehicle seat back 24, the unified support 14 and the contraction and stiffness it provides, by may exert a radially inward directed pressure against the torso 6 (see arrows in FIG. 5). This radially inward directed pressure may thus offer support and stabilization to the torso 6 during the collision and inhibit localized deflections of the torso 6.

The inflatable modules 8, 10, 12 may each be formed from a material configured to define an interior volume. The modules 8, 10, 12 may each include one or more sheets or pieces of the material that are connected together to define the interior volume. The modules 8, 10, 12 may each be in the configuration of an inflatable bag as depicted in the figures, which bag can be inflated with a fluid, e.g. gas.

Before a collision, the modules 8, 10, 12 may be stored in a stored condition, where the modules 8, 10, 12 may be compressed, deflated, and unconnected from one another. By "deflated," it is meant that the modules 8, 10, 12 are not fully inflated, which could be a state where the interior volume of the modules 8, 10, 12 is less than at a maximum. When deflated, the interior volume may be at a minimum and have no gas therein (fully deflated), or the interior volume may be somewhere between the minimum and the maximum and have some gas therein (i.e. partially inflated).

Figure 6:
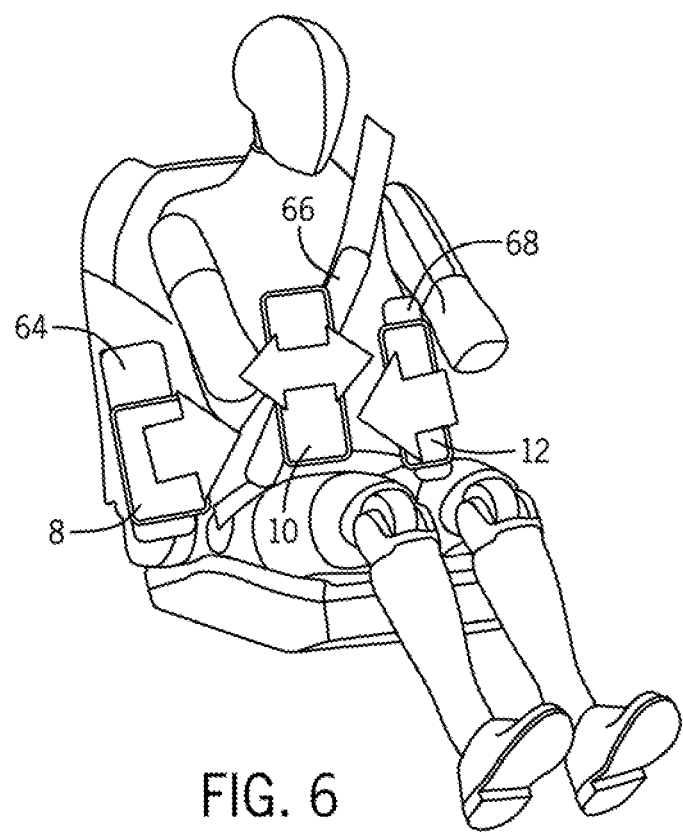
FIG. 6 is a front inboard schematic perspective view of a torso stabilization restraint after having been deployed from storage according to the present subject matter.

In the stored condition, the modules 8, 10, 12 may be arranged separate and distinct from one another such that they are not connected, and each is deflated and compressed. The modules 8, 10, 12 may be compressed by being in a rolled arrangement, a folded arrangement, a crumpled arrangement, or other arrangement where the modules 8, 10, 12 are compacted so as to take up a smaller area or volume than if not compressed. When compressed, each of the modules 8, 10, 12 take up less space than a deployed condition (FIG. 6).

During a collision, a fluid, e.g. gas, may be introduced into the interior volume of each of the modules 8, 10, 12 to inflate each with gas to increase the interior volume and cause each to be deployed (see FIG. 6) from storage. In this deployed condition, the modules 8, 10, 12 are partially opened (e.g. partially unfolded or partially unrolled) from the stored condition, and are partially inflated. However, the modules 8, 10, 12 are still unconnected to one another.

Figure 7:
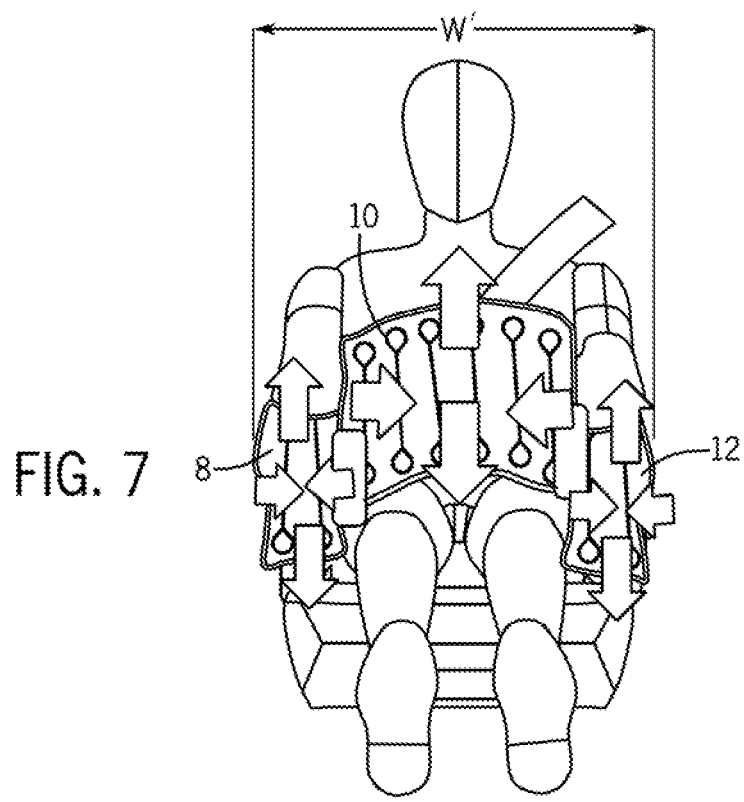
FIG. 7 is a front schematic view of a torso stabilization restraint while being inflated according to the present subject matter.
Figure 8:
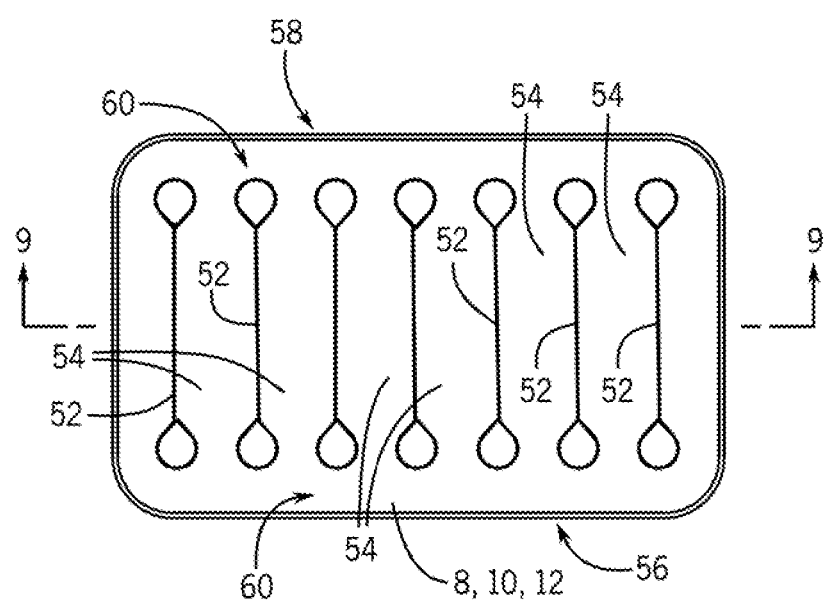
FIG. 8 is a front view of an inflatable module of a torso stabilization restraint according to the present subject matter.

Further inflation of the modules 8, 10, 12 causes them to fully open (e.g. fully unroll or fully unfold), and this facilitates connection between them (See FIG. 7). In this connected condition, the modules 8, 10, 12 are fully opened (e.g. fully unrolled or fully unfolded) and connected, but are still not fully inflated. In other words, the connection of the modules 8, 10, 12 occurs when the modules 8, 10, 12 are in the connected condition and thus before the modules 8, 10, 12 are fully inflated.

Once connected, further inflation of the modules 8, 10, 12 may continue until they are fully inflated to the fully inflated condition, where their interior volume is at a maximum and is filled with gas. This further inflation may cause the modules 8, 10, 12 to experience a change in width and/or height and/or thickness. For example, after the modules 8, 10, 12 are in the connected condition, further inflation the modules 8, 10, 12 may cause each to experience a decrease in width and an increase in height as indicated by the arrows in FIGS. 7 and 10, and an increase in thickness.

The transition of the modules 8, 10, 12 from the stored condition, to the deployed condition, to the connected condition, and then to the fully inflated condition may be a smooth one, as gas may be continually introduced in the interior volume of the modules 8, 10, 12 at a steady rate to produce a constant rate of inflation of the modules 8, 10, 12. Introduction of the gas into the interior volume of each of the modules 8, 10, 12 may be accomplished by injecting gas into the interior volume, or by producing gas (e.g. by a chemical reaction) directly inside the interior volume. Inflation of the modules 8, 10, 12 may be instigated by an electronic control unit of a vehicle in which the torso stabilization restraint 2 is arranged, and may rely on measurements from sensors such as accelerometers which can sense a collision necessitating inflation of the modules 8, 10, 12.

When in the stored condition, the modules 8, 10, 12 are unconnected from one another. That is, the modules 8, 10, 12 are stored separated from one another. During a collision however, the modules 8, 10, 12 are inflated, and thus connect to one another to form the unified support 14.

The inflatable first module 8 may be an inboard module stored at an inboard side 34 of the seat 22, e.g. near a center console 38 of the vehicle and opposite from a door 36 of the vehicle. The first module 8 may be stored in a concealed manner on the inboard side 34 of the seat 22, e.g. the inboard side 34 of the seat back 24, or within a storage compartment 64 on the inboard side 34 of the seat 22 or seat back 24. The first module 8 may be deployable from the storage compartment 64 on or within the seat 22 during a collision. When deployed and inflated, the first module 8 is arranged near the inboard side 34 of the seat 22. The first module 8 may be anchored to the inboard side 34 of the seat 22 after it is deployed, and thus held in place there during a collision. The first module 8 may be arranged on the inboard (e.g. right) side 34 of the seat 22, and thus on the inboard (e.g. right) side 18 of the torso 6 of the occupant 4.

The inflatable second module 10 may be a central module stored in a concealed manner on the lap belt 28 or shoulder belt 32, or within a storage compartment 66 of the lap belt 28 or shoulder belt 32. The second module 10 may be deployable from the storage compartment 66 arranged on or within the seat belt 26 during a collision. When deployed and inflated, the second module 10 is arranged between the first module 8 and the third module 12, and thus is central to the first and third modules 8, 12. The second module 10 may be anchored to the seat belt 26 after it is deployed, and thus held in place there during a collision. The second module 10 may be arranged central to the torso 6 of the occupant 4.

The inflatable third module 12 may be an outboard module stored at an outboard side 40 of the seat 22, e.g. near a door 36 of the vehicle and opposite from the center console 38 of the vehicle. The third module 12 may be stored in a concealed manner on the outboard side 40 of the seat 22, e.g. the outboard side 40 of the seat back 24, or within a storage compartment 68 on the outboard side 40 of the seat 22 or seat back 24. The third module 12 may be deployable from the storage compartment 68 arranged on or within the seat 22 during a collision. When deployed and inflated, the third module 12 is arranged near the outboard side 40 of the seat 22. The third module 12 may be anchored to the outboard side 40 of the seat 22 after it is deployed, and thus held in place there during a collision. The third module 12 may be arranged on the outboard (e.g. left) side 40 of the seat 22, and thus on the outboard (e.g. left) side 20 of the torso 6 of the occupant 4.

As will be understood, the occupant 4 may be seated on the other side of the vehicle from that depicted in the figures, such that the door is on the other side of the occupant as that shown. In this configuration, the outboard side of the seat or occupant would then be the left side of the seat or occupant, while the inboard side of the seat or occupant would be the right side of the seat or occupant.

Before a collision, the modules 8, 10, 12 may be stored in respective storage compartments 64, 66, 68 (see FIG. 6). The modules 8, 10, 12 may each be deployed from respective storage compartment 64, 66, 68 by introducing gas in the interior volume of each module 8, 10, 12. This introduction of gas causes each of the modules 8, 10, 12 to come out of respective storage compartments 64, 66, 68 to assume the deployed condition (FIG. 6).

Once deployed from storage, the modules 8, 10, 12 can then be further inflated to the connected condition (FIG. 7), where each module 8, 10, 12 is fully opened (e.g. completely unfolded or unrolled), and can thereby connect to one another to form the unified support 14. However, the modules 8, 10, 12 in the connected condition are still not fully inflated, but are only partially inflated. When the modules 8, 10, 12 are in the form of a bag and in the connected condition, the modules 8, 10, 12 may be in a generally flat configuration.

When in the connected condition, i.e. fully opened and partially inflated, the modules 8, 10, 12 have an overall width W'. After they are connected, the modules 8, 10, 12 are then further inflated to the fully inflated condition, which results in each of their widths being reduced. That is, further inflation of the modules 8, 10, 12 from the connected condition to the fully inflated condition may result in a reduction of a width W of at least one of the modules 8, 10, 12 from a first width $W_1$ to a second width $W_2$, while a height H of one or more of the modules 8, 10, 12 may increase from a first height $H_1$ to a second height $H_2$. This is shown in FIGS. 7 and 10 for example.

Figure 10:
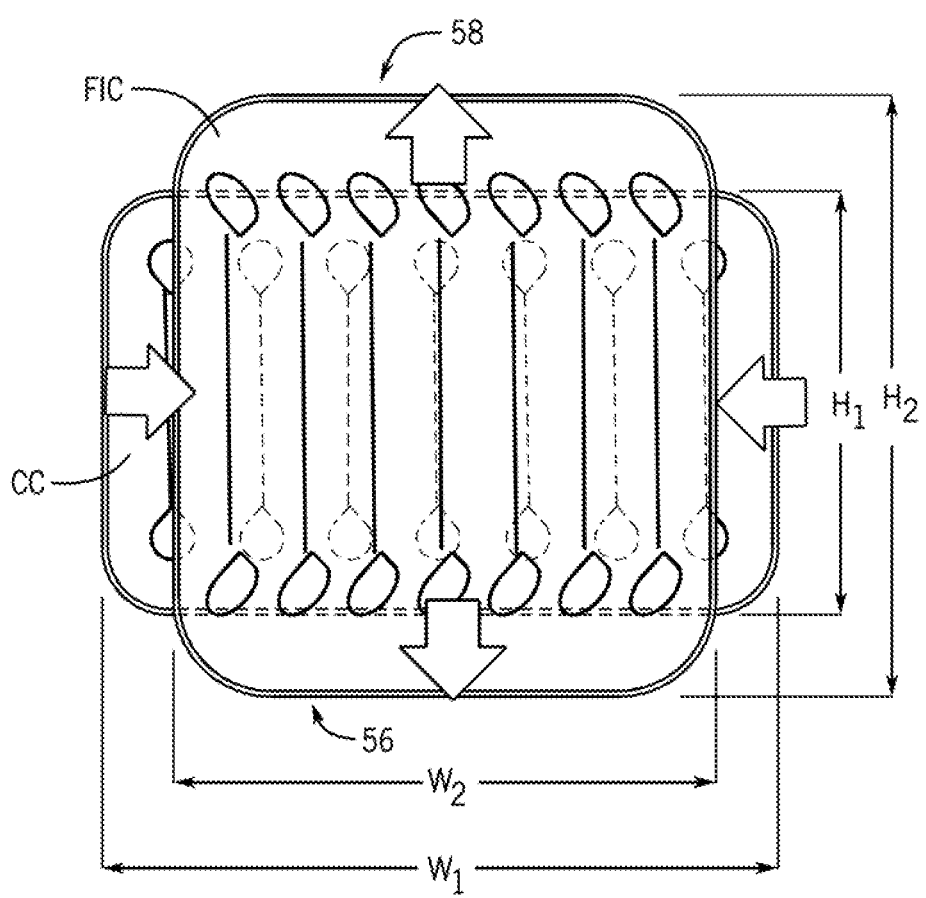
FIG. 10 is a front schematic view of the inflatable module of FIG. 8 being inflated.

FIG. 10 depicts a single module, which is representative of any of the modules 8, 10, 12, in a connected condition (indicated "CC" in FIG. 10), and schematically depicts the process further inflating the module to a fully inflated condition (indicated "FIC" in FIG. 10). During this process, the width W of the module decreases as indicated by the two inward pointing horizontal arrows; and a height H of the module increases as indicated by the two outward pointing vertical arrows. FIG. 7 shows a similar change in the size of each of the modules 8, 10, 12 during inflation, as indicated by the arrows.

Figure 5:
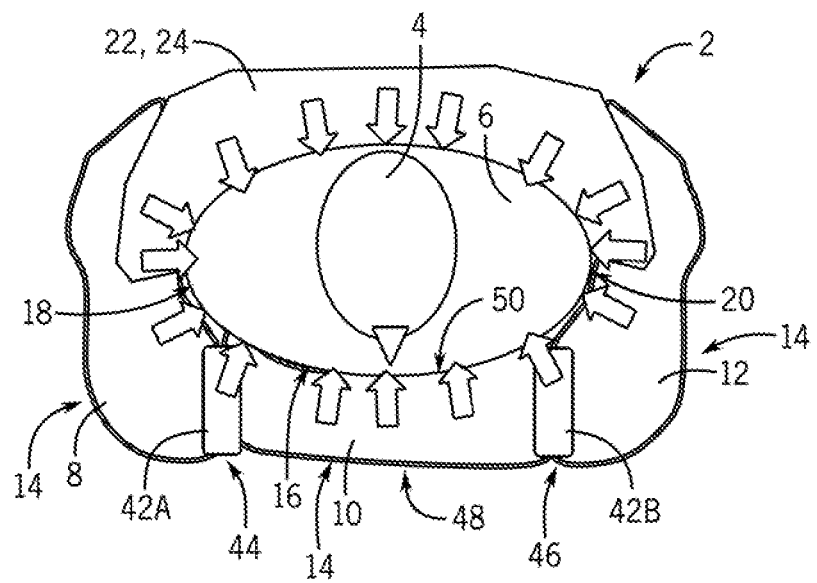
FIG. 5 is a horizontal cross-sectional view of a torso stabilization restraint according to the present subject matter.

The reduction of the width W and increase of the height H when the modules 8, 10, 12 are inflated between the connected condition and the fully inflated condition, may be due to the modules 8, 10, 12 including the seams 52 and corresponding cells 54. This decrease of the width W of one or more of the modules 8, 10, 12 may result in an overall width W of the unified support 14 (i.e. a collective width of the modules 8, 10, 12 when connected) to also decrease when the modules 8, 10, 12 are further inflated from the connected condition to the fully inflated condition. Additionally, further inflation of the modules 8, 10, 12 from the connected condition to the fully inflated condition may result in an increase in a thickness T of the modules 8, 10, 12 as measured from the first side 48 to the second side 50. When the modules 8, 10, 12 are connected and anchored to the seat 22, further inflation from the connected condition results in an increase in thickness T of the modules 8, 10, 12. This increase in thickness T and decrease in overall width W may cause the unified support 14, in combination with the seat back 24, to exert pressure radially inwardly against the torso 6 of the occupant 4, which is depicted in FIG. 5 by radially inward pointing arrows. Such inward directed pressure against the torso 6 may provide support to, and help stabilize, the torso 6 during a collision, thus inhibiting high localized deflections of the torso 6 during a collision. Inflation of the modules 8, 10, 12 may also provide protection against blunt impact to the torso 6 from interior vehicle components such as the steering wheel of the vehicle.

One or more, and preferably all three modules 8, 10, 12 include connectors 42 for reversibly connecting together the three modules 8, 10, 12 to form the unified support 14. The connectors 42 may include hook and loop connectors, reversible interlocking fibers or microfibers, or other reversibly linking connectors. The connectors 42 may be arranged on edges of each of the modules 8, 10, 12 so as to connect the modules 8, 10, 12 along interfaces 44, 46 between them. In a non-limiting example, the first module 8 is directly connected by connectors 42A at a first interface 44 to the second module 10, and the second module 10 is directly connected by connectors 42B at a second interface 46 to the third module 12. The first and second interfaces 44, 46 may each be generally vertical (±10 degrees from vertical) between the modules 8, 10, 12. The connectors 42 may extend along a portion of the interfaces 44, 46, or along the entire interfaces 44, 46.

The modules 8, 10, 12 may connect below a shoulder level and underneath the arms 62 of the occupant 4 as depicted in FIGS. 1-4. The connected modules 8, 10, 12 (i.e. the unified support 14) are configured to contact the torso 6 of the occupant 4, or the clothing covering the torso 6 of the occupant 4. In a non-limiting example, the unified support 14 is not arranged over the arms 62 of the occupant 4 so as not to pin the arms 62 against the torso 6 during a collision. As such, the first interface 44 may be arranged under the occupant's inboard arm 62A, and the second interface 46 may be arranged under the occupant's outboard arm 62B.

Figure 9:
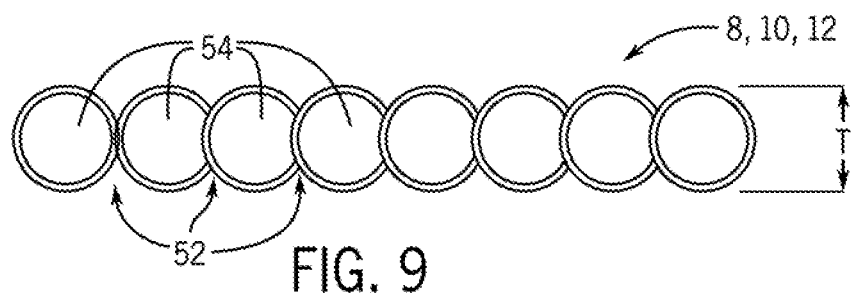
FIG. 9 is a cross-sectional view taken along line 9-9 of the inflatable module of FIG. 8.

The modules 8, 10, 12 may each include a first side 48 and an opposite second side 50. When the modules 8, 10, 12 are in the fully inflated condition (i.e. fully inflated and connected to form the unified support 14), the first side 48 may face away from the occupant 4, and the second side 50 may face, and optionally contact, the occupant 4. The first side 48 may be connected to the second side 50 along seams 52, which seams 52 may separate the modules 8, 10, 12 into cells 54. The seams 52 and cells 54 may be arranged generally vertically. The cells 54 may each have a generally circular cross section (FIG. 9). The seams 52 may be formed by stitching, adhesive, welding, or other device or method. The seams 52 may extend fully or partially between a bottom 56 and top 58 of each of the modules 8, 10, 12. In a non-limiting example, the seams 52 extend only partially between the bottom 56 and top 58 of each of the modules 8, 10, 12, such that the cells 54 are open at their ends 60 where there are no seams 52, and are in fluid communications at their ends 60 with others of the cells 54.

After a collision, the modules 8, 10, 12 can each be deflated by removing gas from the interior volume. This deflation can be accomplished passively by having apertures extending through the material of the modules 8, 10, 12 from the exterior to the interior volume, thus passively allowing gas to escape from the interior volume; or by actively sucking out gas from the interior volume by use of a vacuum/pump, for example.

After the collision, the unified support 14 can be disassembled/decoupled at the interfaces 44, 46 in order to allow the occupant 4 to be free from the unified support 14. This disassembly/decoupling can be accomplished after the modules 8, 10, 12 are deflated, and by unfastening the connectors 42 to separate the first module 8 from the second module 10, and to separate the second module 10 from the third module 12. The separation of the modules 8, 10, 12 thus allows the occupant 4 to be free of the unified support 14.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A torso stabilization restraint including:
   an inflatable first module;
   an inflatable second module;
   an inflatable third module; and
   connectors arranged on one or more of the modules and configured to reversibly connect a) the first module and the second module, and b) the second module and the third module when the first, second, and third modules are inflated;
   wherein the torso stabilization restraint is configured to restrain a user in a seat; and
   wherein inflation and connection of the first, second, and third modules causes a combination of the torso stabilization restraint and the seat to contract around a torso of the user and exert a radially inward directed pressure on the torso of the user.

2. The torso stabilization restraint according to claim 1, wherein:
the first and third modules are deployable from the seat, in which seat each of the first and third modules are stored while deflated; and
the second module is deployable from a seat belt associated with the seat, in which seat belt the second module is stored while deflated.

3. The torso stabilization restraint according to claim 2, wherein:
the first module is anchored on an inboard side of the seat;
the second module is anchored on the seat belt;
the third module is anchored on an outboard side of the seat.

4. The torso stabilization restraint according to claim 3, wherein the second module is configured to be in contact with a front of the torso of the user when the second module is inflated.

5. The torso stabilization restraint according to claim 1, wherein the connectors include reversible interlocking microfibers.

6. The torso stabilization restraint according to claim 1, wherein the torso stabilization restraint and the seat combine to form a perimeter around the torso of the user.

7. The torso stabilization restraint according to claim, 1 wherein:
the first, second, and third modules are connected before the first, second, and third modules are fully inflated,
when the first, second, and third modules are connected and at least one module of the first, second, and third modules is not fully inflated, the at least one module has a width; and
the width decreases as the at least one module is fully inflated.

8. The torso stabilization restraint according to claim 7, wherein:
the first, second, and third modules are configured to be connected along interfaces that are generally vertical;
the at least one module comprises a bag including a first side facing away from the user and being connected along seams to a second side of the bag facing the user; and
the seams define cells within the bag.

9. The torso stabilization restraint according to claim 1, wherein the first, second, and third modules connect below a shoulder level and underneath arms of the user.

10. A torso stabilizer including:
an inflatable inboard module deployable from an inboard side of a seat;
an inflatable outboard module deployable from an outboard side of the seat; and
an inflatable central module deployable from a seat belt associated with the seat, and configured to couple to the inboard and outboard modules when the inboard, outboard, and central modules are inflated;
wherein inflation and connection of the inboard, outboard, and central modules causes a combination of the torso stabilizer and the seat to contract around a torso of a user and exert a radially inward directed pressure on the torso of the user.

11. The torso stabilizer according to claim 10, wherein the inboard, outboard, and central modules are reversibly coupled via interlocking microfibers arranged on an edge of each of the inboard, outboard, and central modules.

12. The torso stabilizer according to claim 10, wherein the central module is arranged between the inboard and outboard modules when the inboard, outboard, and central modules are inflated and coupled.

13. The torso stabilizer according to claim 10, wherein the torso stabilizer and a seat back of the seat combine to form a perimeter around the torso.

14. The torso stabilizer according to claim 10, wherein the inboard and outboard modules are anchored to the seat when inflated and coupled to the central module.

15. The torso stabilizer according to claim 10, wherein before being inflated:
the inboard, outboard, and central modules are stored while deflated;
the inboard and outboard modules are stored in the seat; and
the central module is stored in the seat belt.

16. The torso stabilizer according to claim 10, wherein:
the inboard, outboard, and central modules are connected before the inboard, outboard, and central modules are fully inflated,
when the inboard, outboard, and central modules are connected and not fully inflated, the inboard, outboard, and central modules have a collective width; and
the collective width decreases as the inboard, outboard, and central modules are fully inflated.

17. The torso stabilizer according to claim 10, wherein:
the torso stabilizer is arranged in a vehicle;
the inboard, outboard, and central modules deploy upon the vehicle experiencing a collision;
the inboard, outboard, and central modules connect via connectors and are decouplable at the connectors.

18. The torso stabilizer according to claim 10, wherein the inboard, outboard, and central modules each comprise a bag including vertical stitching connecting a front of the bag with a back of the bag to thereby define vertical cells within the bag.

19. A torso stabilization restraint including:
an inflatable first module;
an inflatable second module;
an inflatable third module; and
connectors arranged on one or more of the modules and configured to reversibly connect a) the first module and the second module, and b) the second module and the third module when the first, second, and third modules are inflated;
wherein the torso stabilization restraint is configured to restrain a user in a seat;
wherein when the first, second, and third modules are inflated and connected, the torso stabilization restraint and the seat combine to exert radially inward directed pressure on a torso of the user; and
wherein the second module is arranged between the first and third modules when the first, second, and third modules are inflated and connected.

* * * * *